(12) United States Patent
Seba et al.

(10) Patent No.: US 11,885,284 B2
(45) Date of Patent: Jan. 30, 2024

(54) FUEL INJECTION DEVICE FOR AN INTERNAL COMBUSTION ENGINE, IN PARTICULAR FOR A HYDROGEN COMBUSTION ENGINE

(71) Applicant: Liebherr Machines Bulle SA, Bulle (CH)

(72) Inventors: Bouzid Seba, Broc (CH); Bakir Puran, Vuisternens-en-Ogoz (CH)

(73) Assignee: Liebherr Machines Bulle SA, Bulle (CH)

( * ) Notice: Subject to any disclaimer, the term of this patent is extended or adjusted under 35 U.S.C. 154(b) by 0 days.

(21) Appl. No.: 17/861,821

(22) Filed: Jul. 11, 2022

(65) Prior Publication Data
US 2023/0019785 A1 Jan. 19, 2023

(30) Foreign Application Priority Data
Jul. 12, 2021 (CH) .................................. 070041/21

(51) Int. Cl.
*F02M 21/02* (2006.01)
*F02D 19/02* (2006.01)

(52) U.S. Cl.
CPC ....... *F02M 21/0239* (2013.01); *F02D 19/022* (2013.01); *F02D 19/027* (2013.01); *F02M 21/0206* (2013.01); *F02M 21/0233* (2013.01); *F02M 21/0245* (2013.01); F02D 2200/0602 (2013.01); F02M 2200/40 (2013.01)

(58) Field of Classification Search
CPC ........... F02M 21/0206; F02M 21/0218; F02M 21/0233; F02M 21/0239; F02M 21/0245; F02D 19/022
See application file for complete search history.

(56) References Cited

U.S. PATENT DOCUMENTS

| 7,627,416 | B2* | 12/2009 | Batenburg | ......... F02M 21/0224 123/525 |
| 10,041,435 | B2* | 8/2018 | Wakeman | ........... F02D 41/3845 |
| 2014/0364273 | A1* | 12/2014 | Martin | .................. B60W 10/08 180/65.265 |
| 2015/0075484 | A1* | 3/2015 | VanDerWege | ..... F02M 63/0001 123/294 |
| 2016/0245218 | A1* | 8/2016 | Ulrey | ................... F02M 59/464 |
| 2016/0377017 | A1* | 12/2016 | Basmaji | ............. F02D 41/3094 701/103 |

(Continued)

FOREIGN PATENT DOCUMENTS

| DE | 19547877 A1 | 6/1997 |
| DE | 19753072 A1 | 6/1999 |

(Continued)

*Primary Examiner* — Phutthiwat Wongwian
*Assistant Examiner* — Anthony L Bacon
(74) *Attorney, Agent, or Firm* — Dilworth & Barrese, LLP (57) ABSTRACT

The invention relates to a fuel injection device for an internal combustion engine comprising at least one central rail which is in fluid communication with at least one primary fuel tank, characterized in that at least one auxiliary fuel pressure accumulator is provided, the internal volume of which is in communication with the central rail via at least one control valve in order to temporarily provide a simultaneous fuel supply to the central rail from the auxiliary fuel pressure accumulator and the primary fuel tank.

20 Claims, 7 Drawing Sheets

(56) References Cited

U.S. PATENT DOCUMENTS

2019/0368449 A1* 12/2019 Klein ................. F02D 41/3845
2021/0301775 A1* 9/2021 Puran ....................... F17C 7/00

FOREIGN PATENT DOCUMENTS

| DE | 102009028739 A1 | 3/2011 | |
|----|----|----|----|
| DE | 102012224027 A1 | 6/2014 | |
| DE | 102017213120 A1 | 1/2019 | |
| EP | 2180174 A1 * | 4/2010 | ........... F02M 55/025 |
| EP | 2180174 A1 | 4/2010 | |
| EP | 3741984 A1 | 11/2020 | |
| FR | 2787520 A1 | 6/2000 | |
| WO | WO-2015169684 A1 * | 11/2015 | ......... F02M 21/0224 |
| WO | 2015/196244 A1 | 12/2015 | |
| WO | WO-2015196244 A1 * | 12/2015 | ......... F02M 21/0239 |
| WO | 2018/072839 A1 | 4/2018 | |
| WO | 2019/048134 A1 | 3/2019 | |

* cited by examiner

FUEL INJECTION DEVICE FOR AN INTERNAL COMBUSTION ENGINE, IN PARTICULAR FOR A HYDROGEN COMBUSTION ENGINE

BACKGROUND OF THE INVENTION

The invention relates to a fuel injection device for an internal combustion engine comprising at least one rail which is part of two fuel paths.

Due to the generally known advantages of internal combustion engines, fuel is often supplied to the intake manifold or combustion chambers at a greatly increased pressure. If the engine concept provides for the same, the internal combustion engine often has a pressure accumulator known as a rail, to which the fuel is first supplied. In most cases, a common rail is used for a group of several or all combustion chambers of the internal combustion engine, which is then referred to as the central rail.

When the target output of the internal combustion engine increases, the opening duration of the specific injector via which the current fuel supply to the respective combustion chamber is to take place is extended. In the case of an internal combustion engine supplied with liquid fuel, the resulting drop in rail pressure is kept within certain limits even with an extended injection period and thus an increased fuel delivery quantity from the rail, which enables compensation in terms of the fuel delivery rate. In order to achieve more accurate compliance with the desired fuel metering, this additional opening period of the injector can in turn contain the period of time that includes the drop in fuel mass flow that results from the drop in rail pressure. After a certain period of time, the rail pump delivers a higher fuel quantity, which leads to the rail pressure setpoint being reached again even if the increased fuel consumption persists. Normally, a rail pump in delivery mode always delivers a quantity of fuel to the rail that is at least slightly greater than the fuel torque consumption of the internal combustion engine. If the rail pressure reaches or has already exceeded its setpoint, the excess fuel quantity is diverted from the rail and usually returned to the primary fuel tank.

Since liquids can be compressed much more easily than gases to a pressure level of several tens of bar up to many hundreds of bar, and at the same time have a significantly higher volumetric density than gases, and the widely used liquid fuels (diesel and diesel-like fuels, gasoline, LPG, etc.) can be stored practicably at atmospheric or slightly higher pressure at usual ambient temperatures in a fuel primary tank of simple design and handling, the above-mentioned measures can still be implemented relatively easily from a technical point of view with regard to the possibility of rapidly increasing the fuel feed rate for the above-mentioned fuels. In other words, assuming that high-pressure fuel injection is already in place or is mandatory, the additional cost of increasing the supply of liquid fuel within a short period of time is comparatively low.

A rapid increase of the mechanical output power of an internal combustion engine also requires a corresponding dynamic increase in the quantity of air to be supplied. If the requirement for a transient power increase occurs during an initial position in which the instantaneous air supply to the combustion chambers is limited by throttling in the air path and/or the admixture of exhaust gas, at least a certain increase in the air supply is possible at relatively short notice. Furthermore, certain aids are known with which the air supply can be increased comparatively quickly and significantly, e.g. by an electrically driven compressor integrated in the air path.

In the case of an internal combustion engine operated with one of the above-mentioned liquid fuels, its dynamics are essentially due to the limited rate of increase of the air supply. In contrast, the dynamics of a gas engine can also be determined by a limited rate of increase in the fuel supply. In other words, if a gas engine requires high power dynamics, it is not sufficient to focus only on the air path. Above a certain dynamic range to be achieved, it is no longer sufficient for only the air path to be equipped with aids that enable a high rate of increase in the air supply; instead, suitable measures must also be taken in the fuel path that enable a high rate of increase in the fuel supply. The latter becomes all the more important the smaller the density of the gaseous fuel.

If a gaseous fuel is stored in the primary tank not in gaseous form but, for example, in liquid form or in a chemical bond, an excess quantity of fuel in the rail can no longer be returned to the primary tank, or return would be very costly and/or impractical.

When a high increase in the target output of a gas engine occurs, extending the respective opening periods of the injectors is only possible to a limited extent, at least temporarily, since an "unexpectedly" long opening of the injectors would lead to a significant drop in the rail pressure. If the opening time of an injector were to be extended excessively in order to meet the fuel quantity requirement of the current injection process approximately or completely, the rail pressure would drop sharply, as a result of which the fuel supply rate for the subsequent injection process(es) would decrease, although this would clearly have to increase with a required increase in power.

If the primary tank of the gaseous fuel is designed as a pressure accumulator and the gas pressure in it exceeds the rail pressure setpoint by a corresponding minimum amount, it is easy to raise the rail pressure quickly. However, if no further aids are provided for raising the rail pressure, a comparatively high proportion of the gaseous fuel located in the primary tank cannot be used if the set value is correspondingly high.

If the gaseous fuel has a very low boiling point and is stored as liquefied gas, the conditioning of the fuel requires strong heating. In such a case, an increase in fuel demand, i.e. an increase in compressed gaseous fuel, both in terms of the pressure level required and in terms of quantity, includes the need for an increase in the heat input into the fuel supply path, coordinated in terms of time and location. Examples of such fuels include liquid hydrogen and liquefied natural gas.

Provided that the gaseous fuel in the primary tank is not stored in its molecular form but chemically bound, an increased supply of fuel in terms of its pressure level and quantity includes all process steps along a multi-stage conditioning path. For example, if the fuel in the primary tank is hydrogen, which in turn is stored in a liquid organic hydrogen carrier (LOHC), this carrier liquid must first be conditioned for a reformation process and undergo this conditioning process. The resulting molecular hydrogen is then already in gaseous form and must then be compressed (again), provided that the pressure level required in the rail is higher than the corresponding pressure level under which the liquid organic hydrogen carrier can be fed to the reformation process in order to obtain the hydrogen compressed to a corresponding extent.

SUMMARY OF THE INVENTION

The object of the present invention is to provide a modified fuel injection device that is characterized by a simple apparatus configuration and provides an energy-efficient possibility of rapidly increasing the fuel delivery rate up to the intended maximum rate into the combustion chambers.

This object is achieved by a fuel injection device according to the features herein. Advantageous embodiments of the fuel injection device are the subject of the description herein.

According to the invention, it is proposed to supplement the injection device with at least one additional fuel pressure accumulator, the internal volume of which is connected to the at least one rail via at least one control valve. In the event that the internal combustion engine has several combustion chambers, there is preferably a so-called central rail via which the fuel path for supplying several or all combustion chambers extends. The valve control allows the fluid connection between the auxiliary fuel pressure accumulator and the central rail to be opened and closed as required. This provides the possibility of providing the central rail with a higher fuel quantity for a limited period at short notice, i.e. almost without delay. When the control valve is open, the central rail is supplied with a certain amount of fuel from the auxiliary fuel pressure accumulator in addition to the regular fuel path from the primary fuel tank. Such a parallel supply from the primary fuel tank and the auxiliary fuel pressure accumulator is particularly useful in the case of a comparatively high rate of increase in the desired fuel metering. The supplementary supply of fuel from the auxiliary fuel pressure accumulator can prevent or reduce a pressure drop in the central rail, which would otherwise be present or occur to a significantly greater extent due to the extended opening times of the injectors. With a sufficiently high fuel supply in the auxiliary fuel pressure accumulator, a possible fuel deficit can be compensated until the regular fuel path from the primary fuel tank to the central rail has been adapted to the higher fuel supply.

The invention makes it possible to overcome the problems mentioned at the beginning for gas engines. Due to the particularly low volumetric energy density of gaseous hydrogen and the technically high cost of hydrogen compression, an application of the invention to hydrogen engines results in a particularly high benefit. Accordingly, an injection device according to the invention offers a high benefit for supplying such internal combustion engines which are operated with a gaseous fuel. The primary fuel tank is suitable for providing the fuel, in particular hydrogen, and the fuel may be storable in the primary tank in liquid or gaseous form. In the case of hydrogen engines, the hydrogen can be stored in (i) molecular form or (i) alternatively as a gas admixed in molecular form to another fuel gas, e.g. methane, or (iii) alternatively in such a chemically bound form that enables so-called hydrogen reformation in the system, e.g. a vehicle, in which the hydrogen engine is operated, with a practicable effort. Insofar as the hydrogen is mixed with another fuel or another fuel component in molecular form, the proportion by weight of the hydrogen is at least 20%, preferably at least 40% and very preferably at least 60%.

Preferably, a preloaded pressure accumulator is used as an auxiliary fuel pressure accumulator. The use of a bladder accumulator is conceivable.

In an advantageous embodiment, there is a connection between the auxiliary fuel pressure accumulator, which extends only via the control valve, and the central rail, which is otherwise direct. In particular, the fluid connection should be kept as short as possible so that the reaction time is as short as possible. This is crucial in order to be able to compensate for any fuel deficit, which can be caused by a sharp increase in the target delivery quantity, as quickly as possible or even to prevent it, thereby keeping a pressure drop in the central rail low or ideally avoiding it. A particularly short line path between the central rail and the auxiliary fuel pressure accumulator results in the case where the auxiliary fuel pressure accumulator is arranged directly on the central rail or at least in the immediate vicinity of the central rail. In an advantageous embodiment, the fluid connection between the central rail and the auxiliary fuel pressure accumulator extends only along aligned openings in the housing walls of the central rail and the auxiliary fuel pressure accumulator. The control valve and any sealing elements may be partially or completely integrated into a housing of the auxiliary fuel pressure accumulator or the central rail.

In one embodiment, all gas paths leading to and from the auxiliary fuel pressure accumulator extend exclusively via the central rail. Clearly, in this case the fuel supply to the auxiliary fuel pressure accumulator is via the central rail. Preferably, there is a single fluid connection between the central rail and the auxiliary fuel pressure accumulator via which fuel can flow from the central rail into the auxiliary fuel pressure accumulator when the control valve is open and via which fuel can flow from the auxiliary fuel pressure accumulator into the central rail when pressure conditions change accordingly. It makes sense to charge the auxiliary fuel pressure accumulator up to a predefined gas pressure, wherein this charging is started by opening the control valve only when the instantaneous consumption required to cover the target power of the internal combustion engine can be covered by withdrawing fuel from the primary tank alone. After pressure equalization between the two fuel volumes inside the central rail and the auxiliary fuel pressure accumulator, the control valve can or is closed again.

Clearly, recharging of the auxiliary fuel pressure accumulator can also be performed in portions if no fuel is removed from the auxiliary fuel pressure accumulator between two or more successive recharging operations, as can be shown by a simple example:

Within a certain period of time, there is an operating phase in which the internal combustion engine is operating at, for example, around 50% full load and the current fuel supply can already be completely covered by a simultaneous fuel withdrawal from the primary tank. If the internal pressure in the auxiliary fuel pressure accumulator is lower than the rail pressure, the corresponding control valve is actuated accordingly, so that after some time the pressure prevailing in the auxiliary fuel pressure accumulator has the same value as the rail pressure. In the subsequent period of the example, there is an increase in the output power demanded by the internal combustion engine, wherein this demanded increase is correspondingly slow, wherein this increase in power can be covered without a gas withdrawal from the auxiliary fuel pressure accumulator. After a certain increase in the engine output, the rail pressure is increased so that the control valve opens and a certain amount of fuel is again supplied to the auxiliary fuel pressure accumulator.

In one of the possible implementations of the invention, a simple and inexpensive configuration of the control valve as a simple directional control valve is sufficient, which has only two switching states and accordingly does not allow for a continuous change of the flow rate. The valve can be actuated by an actuator based, for example, on an electromagnet. The operating environment necessitates spatial separation and/or partitioning of the actuator, in particular the electrical part, from fluid-carrying, i.e. fuel-carrying components, in particular the valve part.

The central rail can be equipped with at least one internal pressure sensor integrated on or in it to monitor the current rail pressure and/or be part of a rail pressure control system. It is advisable to arrange the rail pressure sensor as protected as possible from a possible pressure wave inside the central rail in order to ensure the acquisition of representative measured values. In particular, the pressure sensor should be positioned at a sufficient distance from the inlet passage of the fluid connection of the auxiliary fuel pressure accumulator on the central rail.

Optionally, the auxiliary fuel pressure accumulator can be equipped with its own physically present internal pressure sensor. Alternatively or additionally, the state of the auxiliary fuel pressure accumulator can also be monitored by evaluating the measured values of the rail pressure sensor. In the simplest case, if the control valve is open, the currently measured pressure value of the rail pressure sensor can be selected as the substitute value for the internal pressure in the auxiliary fuel pressure accumulator, whereas if the control valve is closed, the respective final value of the rail pressure sensor at the time immediately before the last closing of the control valve to date is used as the substitute value for the internal pressure of the auxiliary fuel pressure accumulator. Preferably, a software-supported evaluation of several raw data samples is used to obtain a rail pressure value considered relevant in each case, which is then used for all further processes including any existing subsequent calculations that are to be influenced by the actual rail pressure value. Alternatively or additionally, such a procedure is suitable for the obtained raw measured values of a possibly existing pressure sensor and/or temperature sensor, etc., which may be installed inside the auxiliary fuel pressure accumulator.

The fuel injection device may be equipped with a control system configured to keep the control valve closed during normal operation of the internal combustion engine. The control system can be configured to open the control valve as of a certain increase in the required target fuel metering, in particular if, in relation to the currently present fuel supply quantity, the associated rate of increase is above a certain threshold value. After the control valve is opened, it may be kept open for a certain period of time and/or as a function of certain parameters—for example, the amount of fuel to be substituted, the pressure difference in the rail and the auxiliary fuel pressure accumulator, and so on. It may be better not to keep the control valve open continuously, but to open and close it alternately as long as the aforementioned and other criteria are met, i.e. the control valve is switched according to a fixed and preferably variably definable cycle. The switching cycle can preferably be determined dynamically, in particular on the basis of one or more engine operating parameters and/or operating variables of the internal combustion engine. Of relevance in this context may be the current rail pressure and/or the current engine speed or crankshaft speed and/or the setpoint of the fuel metering that can currently be performed and/or the desired value for the current fuel metering.

Optionally, the control system can also coordinate the charging of the auxiliary fuel pressure accumulator via the central rail. In particular, the control system takes into account the respective current internal pressures of the auxiliary fuel pressure accumulator and the central rail and the currently possible fuel delivery rate into the central rail. If the internal pressure in the auxiliary fuel pressure accumulator is lower than the internal pressure in the central rail, the control valve can be opened to equalize the pressure between the auxiliary fuel pressure accumulator and the central rail. It makes sense for this to be coordinated as a function of the current load or currently requested fuel quantity, taking into account the currently possible fuel delivery rate, so that the current fuel supply to the internal combustion engine is not impaired by momentary charging of the auxiliary fuel pressure accumulator. The control system causes the control valve to close at the latest when pressure equalization between the two accumulators has taken place.

With the fuel injection device according to the invention, dynamic control of the deliverable fuel supply rate from a central rail is possible. In addition, it is also possible to consider influencing the air path of the internal combustion engine in order to optimize engine operation. It is conceivable, for example, that the control system which coordinates the opening and closing of the control valve may, if necessary, control the control valve and/or one or more actuators in the air path, such as a throttle valve or a switchable device by means of which an increase in charge air compression can be achieved, in extended coordination with monitoring of the air path and intervention options in the air path.

BRIEF DESCRIPTION OF THE DRAWINGS

Further advantages and features of the invention will be explained in more detail below with reference to an exemplary embodiment shown in the figures. The figures show in.

DESCRIPTION OF THE PREFERRED EMBODIMENTS

Figure 1:
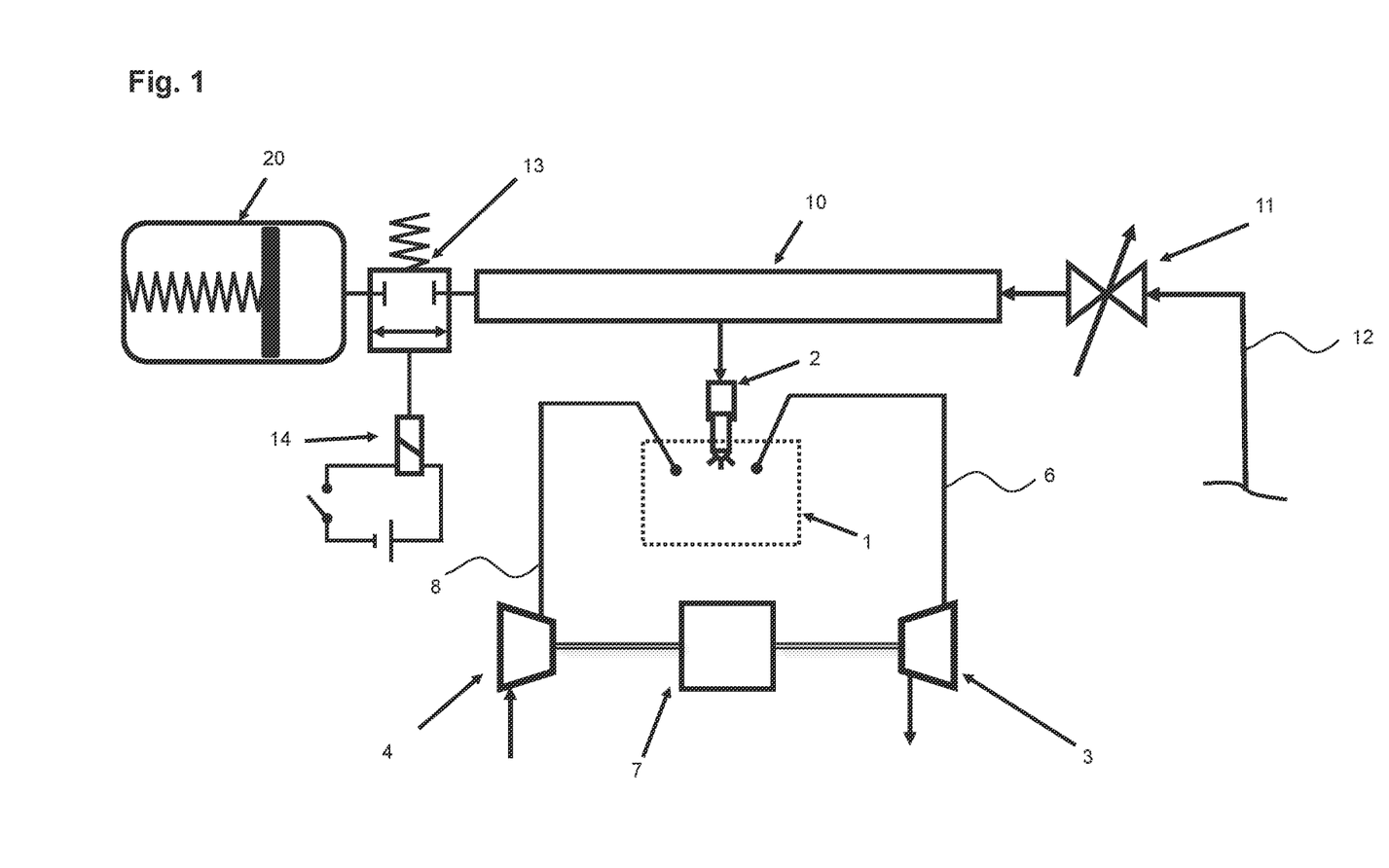
FIG. 1: a schematic representation of the fuel injection device according to the invention for direct injection into an internal combustion engine.

FIG. 1 shows a first exemplary embodiment of the invention with the injection device according to the invention for direct injection into the combustion chamber 1 of an internal combustion engine. In the present case, the engine is a gas engine which is operated with hydrogen as fuel. For this purpose, an injector 2 is provided, via which the required quantity of fuel is injected into the combustion chamber 1 of the internal combustion engine. The supply to the injector 2 or to all injectors of the internal combustion engine is provided from a central rail 10, which is connected to the primary fuel tank (not shown) via a primary fuel path 12 provided with the rail pressure control valve 11. In addition to the fuel, the amount of air required for combustion is made available to the internal combustion engine via the charge air path 8. This is a supercharged internal combustion engine. The turbine 3 is driven by the exhaust gas volume flow in the exhaust gas path 6 and drives the compressor 4 to compress the charge air in the charge air path 8. An electric motor 7 can be provided as a back-up in order to be able to supply additional drive power to the compressor 4 if a rapid increase in the available charge air volume is required.

The idea according to the invention is that the fuel is supplied to the central valve 10 exclusively via the primary fuel path 12 during normal operation, but that in the event of a certain rate of increase in the required target fuel quantity for the combustion chamber 1, an additional fuel quantity can be provided from a separate auxiliary fuel pressure accumulator 20. The additional fuel pressure accumulator 20, designed here as a preloaded pressure accumulator, is fluidically connected directly to the central rail 10 via a control valve 13 designed as a 2/2 directional control valve, whereby an additional fuel quantity can be provided within a short reaction time over the shortest possible line path. The control valve 13 is actuated by an electromagnet 14, which acts on the control valve 13 via a plunger.

Provided that the auxiliary fuel pressure accumulator 20 has a certain amount of fuel, i.e. a certain pressure level is present therein, opening of the control valve 13 is provided when a sharp increase in the target output of the internal combustion engine occurs. As a result, a higher fuel supply rate is temporarily available, which can be made available to the combustion chambers 1 immediately in terms of time. If the fuel supply in the auxiliary fuel pressure accumulator 20 is sufficiently high, the occurrence of a fuel deficit can be compensated for until the device for supplying fuel from the primary fuel tank located in the primary fuel path 12 has adapted to the required higher fuel supply rate and the occurrence of a fuel deficit has therefore become unnecessary.

In order to keep the expense of the device according to the invention as low as possible, there is preferably no separate unit for filling the auxiliary fuel pressure accumulator 20. The auxiliary fuel pressure accumulator 20 is then filled exclusively via the central rail 10 with the control valve 13 open. The control valve 13 remains closed during normal operation and is only opened if fuel is to be supplied to the auxiliary fuel pressure accumulator 20 via the central rail 10 or if fuel is to be supplied from the auxiliary fuel pressure accumulator 20 to the central rail 10 or if the auxiliary fuel pressure accumulator 20 is to be discharged via the control valve 13 for safety reasons. The control valve 13 should have as high a dynamic response as possible and produce as low a pressure loss as possible in the open state. Since the control valve 13 is predominantly closed during operation of the internal combustion engine, it is energetically advantageous if it is open when the solenoid 14 is activated.

Figure 2:
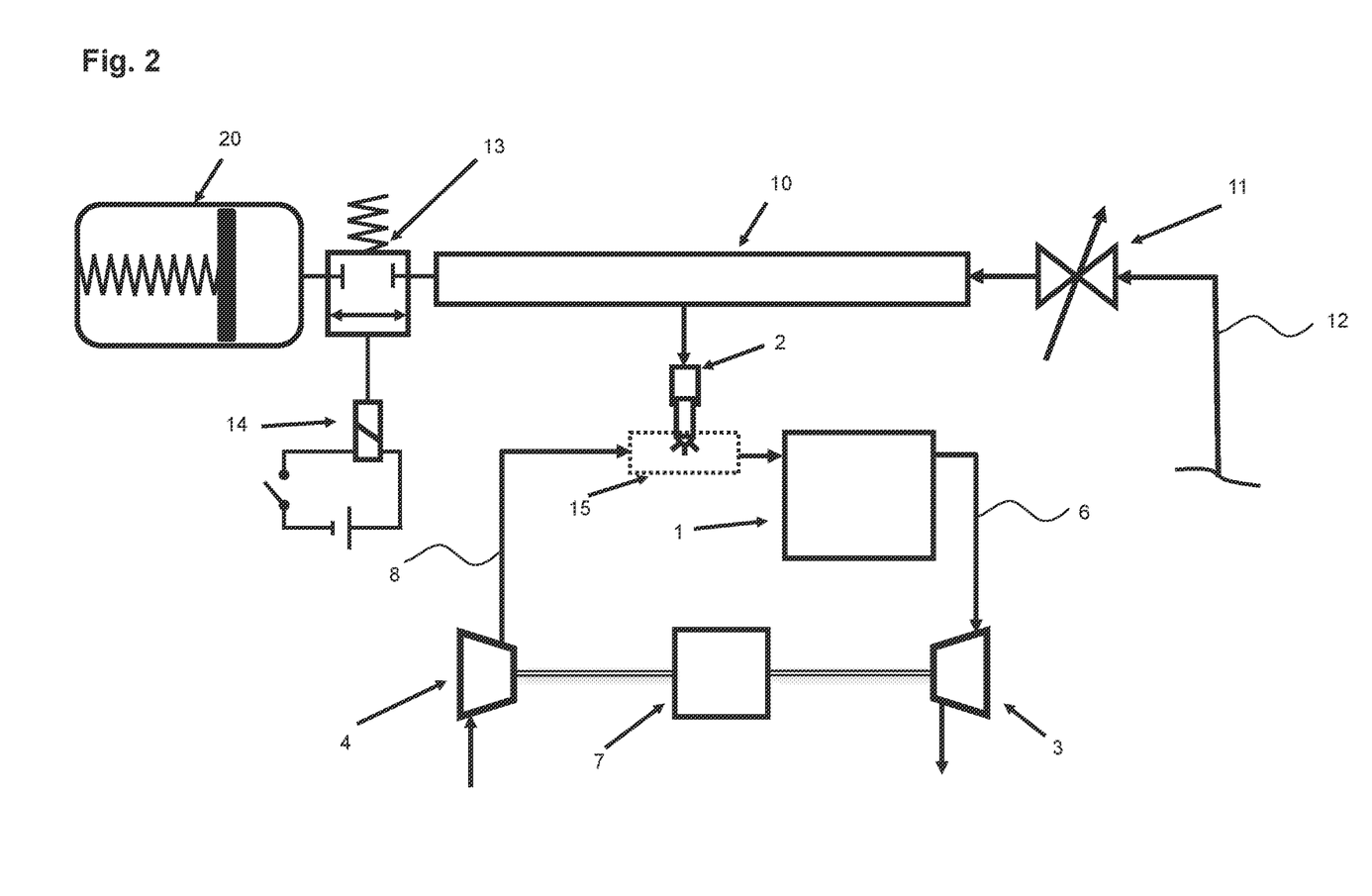
FIG. 2: a schematic diagram of the fuel injection device according to the invention for the case of intake manifold injection.

Deviating from the configuration of FIG. 1, the fuel injection device shown can also be used for an internal combustion engine with intake manifold injection, as shown in FIG. 2. In contrast to the embodiment of FIG. 1, the fuel here is injected by the injector 2 into a common intake manifold 15 of a plurality of combustion chambers 1 or an inlet duct of the combustion chamber 1. In the intake manifold 15 or the inlet duct, the fuel/air mixture is generated and supplied to the combustion chamber 1.

Figure 3:
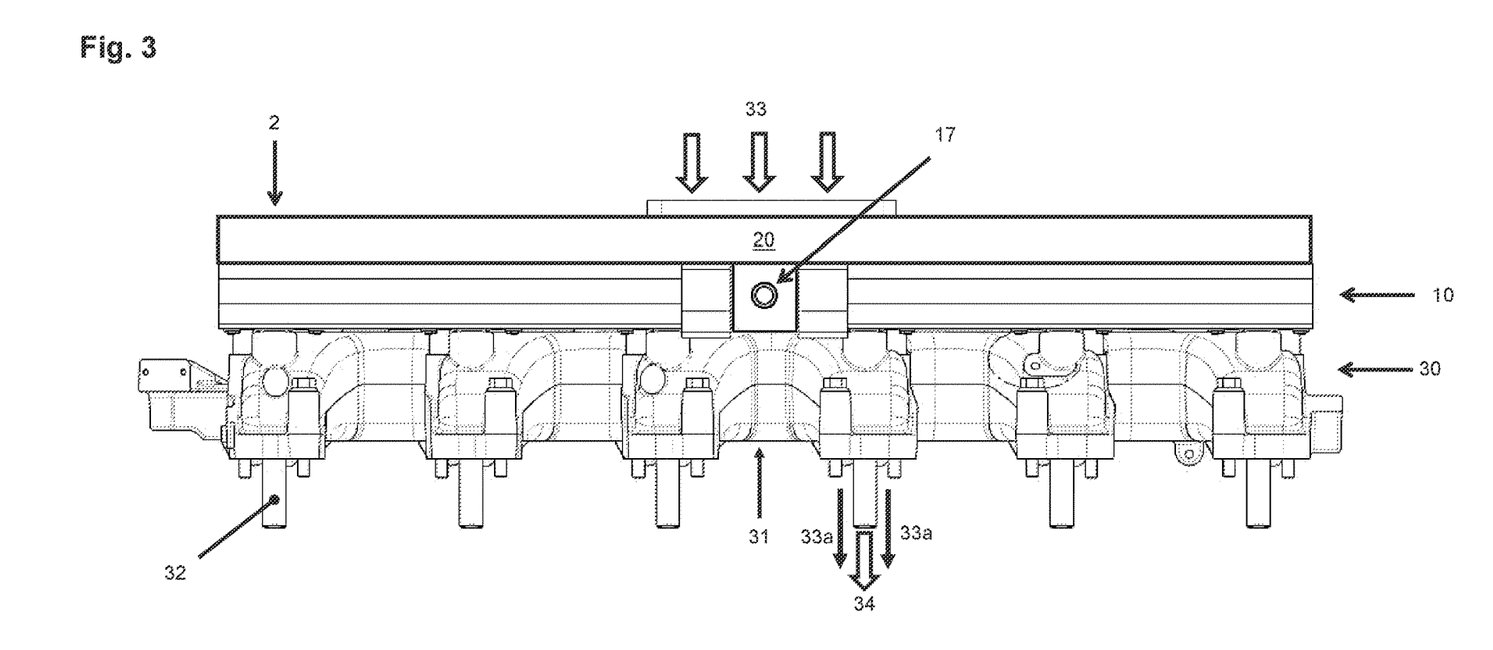
FIG. 3: a perspective view of the underside of an air distributor with attached central rail and auxiliary fuel pressure accumulator.

FIG. 3 shows a bottom view of an air distributor 30 for an internal combustion engine. The air distributor 30 shown here is mounted with its side 31 on the internal combustion engine or on the cylinder head 52 and, in the version shown, supplies six combustion chambers 1 of the internal combustion engine as an example. The charge air flows in the area around the cylinder-specific fuel supply tubes 32 from the air distributor 30 into a respective inlet duct 52*a* of the internal combustion engine or of the cylinder head 52, which is marked here with the reference character 33*a*.

The individual supply tubes 32 each serve to supply fuel into an inlet duct 52*a* from the central rail 10 attached directly to the air distributor 30. The gas connection or fuel connection of the central rail 10 to the primary fuel path 12 is indicated by the reference character 17. The indicated fuel outlet from a supply tube 32 is exemplarily shown with an arrow 34. The cylinder-individual supply tubes 32 each extend, starting from the end of the injector 2 projecting into the central rail 10, through the air distributor 30 and extend into the inlet duct 52*a*. In FIG. 3, the installation position of the injector 2 is only partially visible, because the component ends of the injector 2 located outside the central rail 10 are concealed by the auxiliary fuel pressure accumulator 20 in this view. The central rail 10 is attached to the housing wall of the air distributor 30 opposite the wall 31. Cast-on bushings on the central rail 10 are used for the screw connection between the air distributor 30 and the central rail 10. The reference character 17 indicates the gas connection of the central rail 10 to the primary fuel path 12.

Figure 4:
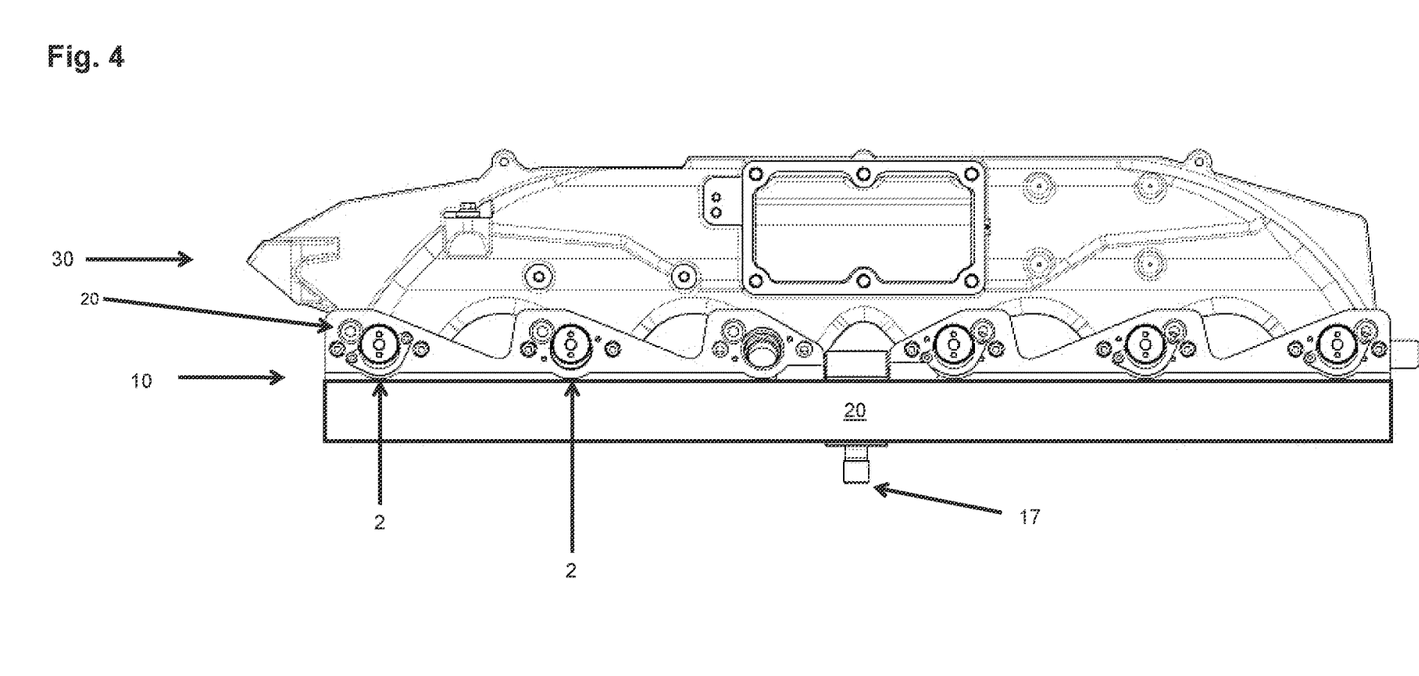
FIG. 4: a rear view of the air distributor according to FIG. 3, FIG. 5: a sectional view with angled cross-section through the internal combustion engine with attached air distributor according to FIGS. 3, 4 and FIG. 6, 7: an enlarged detail view of the sectional view according to FIG. 5.

Mounted behind the central rail 10 is the auxiliary fuel pressure accumulator 20 according to the invention. It can be seen here that fluid communication between these two internal volumes extends along correspondingly aligned openings in the housing walls. The illustration of FIG. 4 shows a view of the air manifold 30 facing away from the internal combustion engine with respect to an attached air manifold 30. In the illustration, only five injectors 2 have so far been installed in the corresponding mounting openings of the central rail 10, with the second injector from the left merely placed in an installation location but not yet fixed. The direct attachment of the auxiliary fuel pressure accumulator 20 to the central rail 10 reduces the required fluid paths between the central rail 10 and auxiliary fuel pressure accumulator 20 to a minimum, so that in the event of a highly dynamic increase in the required fuel supply quantity to the combustion chambers 1, an additional quantity of fuel can be provided from the auxiliary fuel pressure accumulator 20 within a very short period of time.

Figure 5:
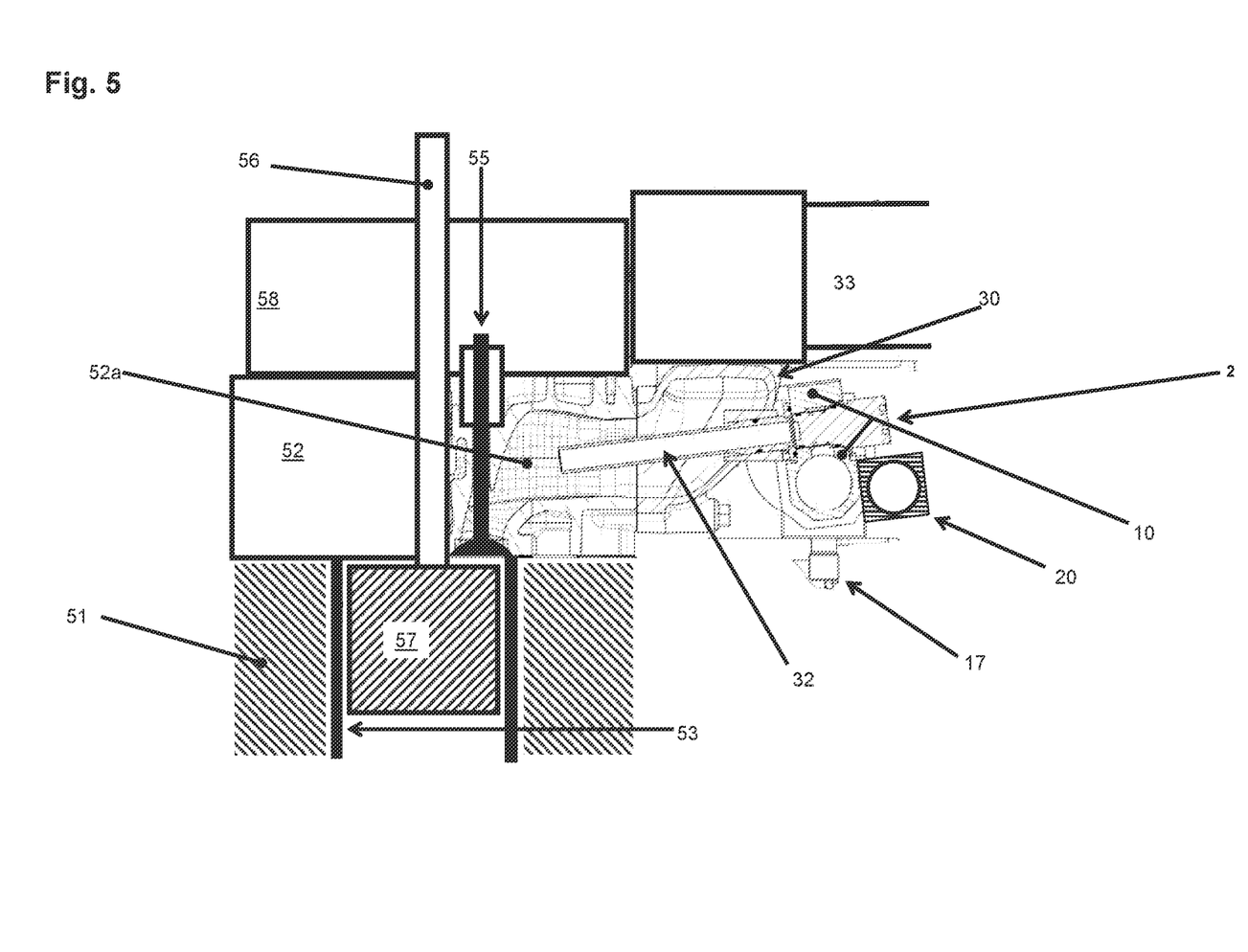
Figure 6:
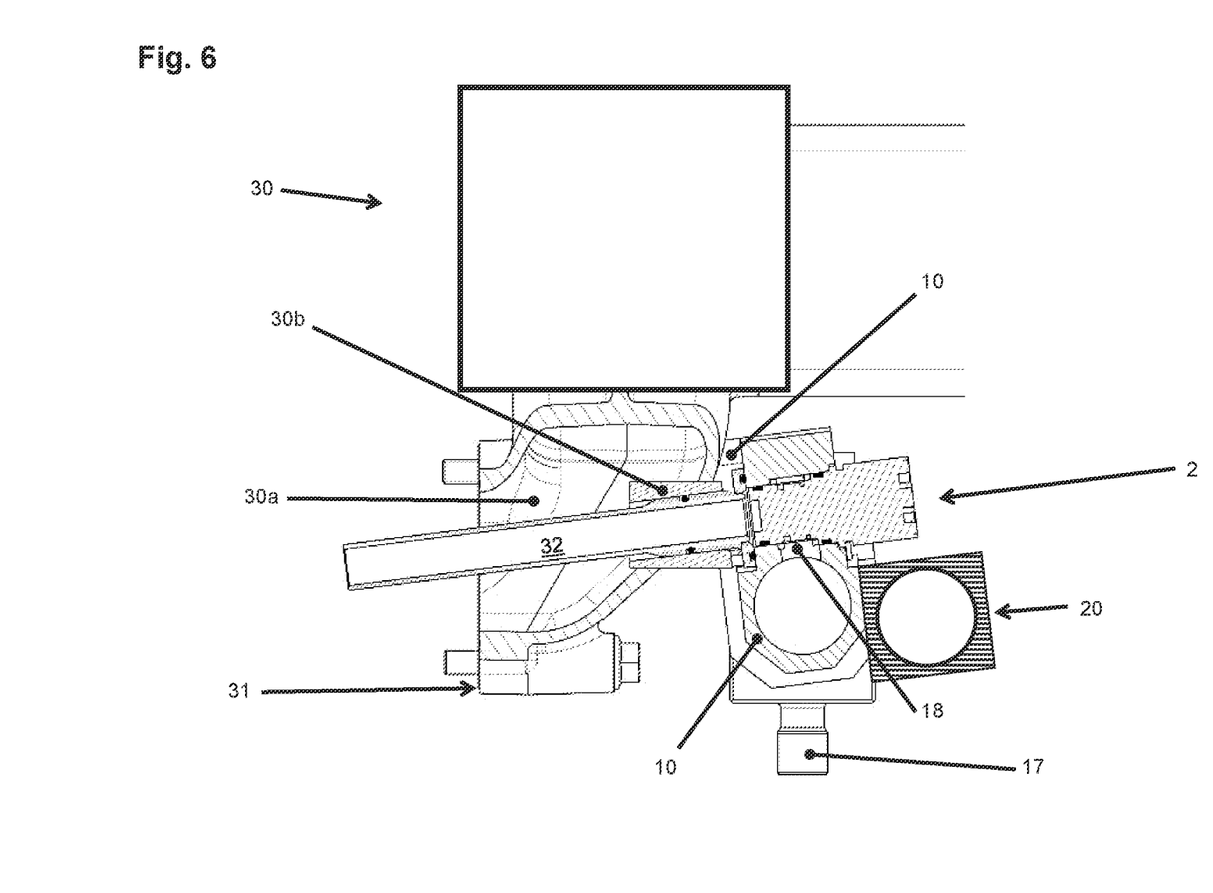
Figure 7:
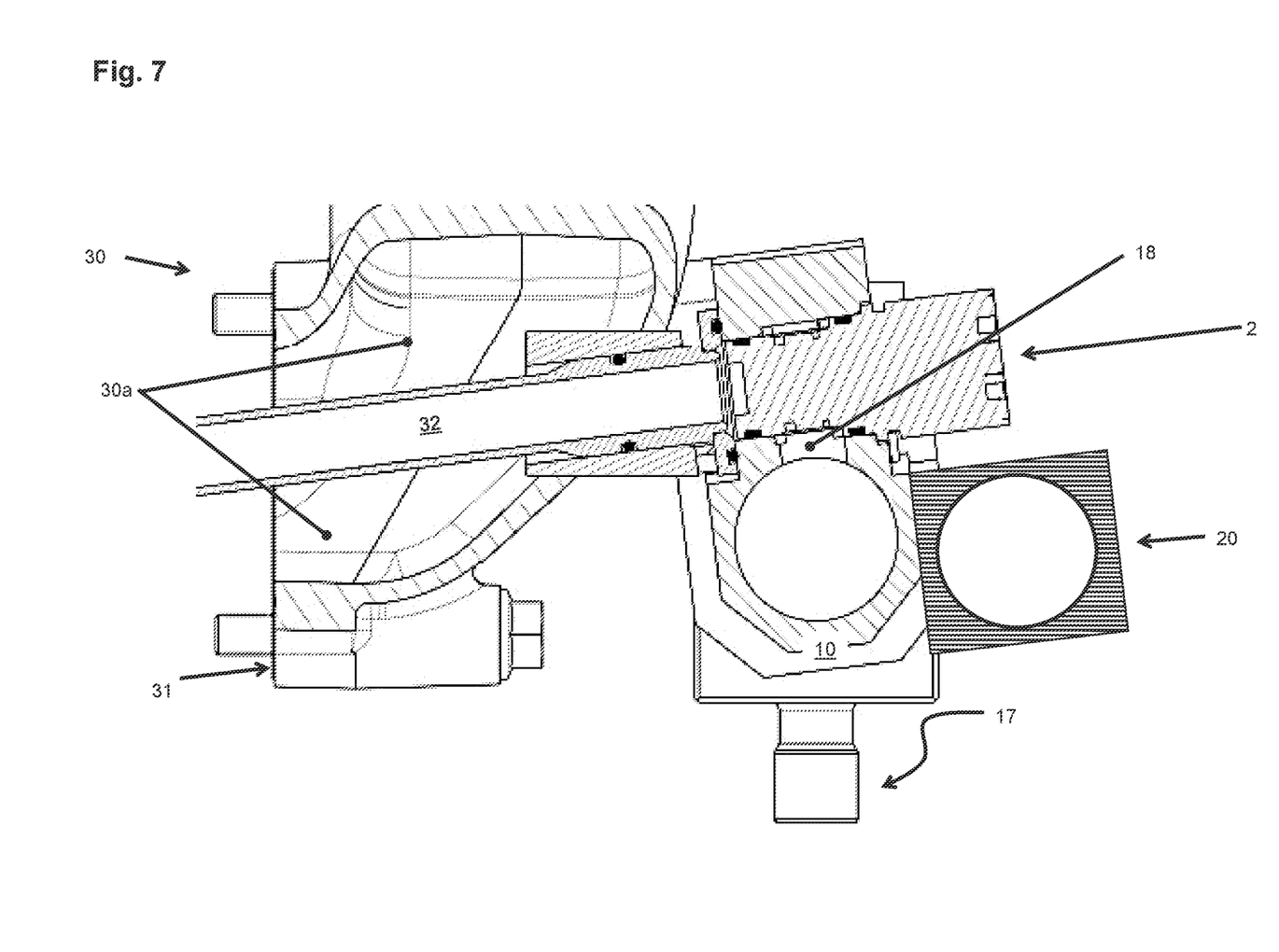

FIGS. 5 to 7 are sectional views of the exemplary embodiment, showing the arrangement and some of the fluid connections of the components of particular focus. These include the central rail 10, the auxiliary fuel pressure accumulator 20, the air distributor 30 and a fuel injector 2, as well as its reaching into the recess present in the cylinder head 52, which forms the inlet duct 52*a* there. FIG. 5 here shows a section through the internal combustion engine, wherein parts which are not essential to the invention are shown only schematically. However, FIG. 5 serves to visualize the embodiment example with respect to the installation position of the air distributor 30, the central rail 10 and the auxiliary fuel pressure accumulator 20 on the internal combustion engine. FIGS. 6, 7 are respective enlargements of the relevant interface area.

The engine block 51 accommodates the liner 53, which in turn accommodates the piston 57. Above the cylinder head 52 is the cylinder head cover 58. Apart from the indicated spark plug 56 and a valve tappet 55, the components located below the cylinder head cover are not shown because they are not the focus of the invention. By means of the valve tappet 55, the flow path of the air-fuel mixture along the inlet duct 52*a* to the combustion chamber is opened and closed in a defined manner, respectively. In the enlarged illustrations, the fluid connection between the inner volume of the central rail 10 and the injector 2 can still be seen. In the region of the rail opening 18, the injector 2 has a circumferential annular groove with a row of radial bores, which can be seen in FIG. 7, through which the fuel from the central rail 10 can enter the injector 2 and be injected into the inlet duct 52a via the supply tube 32.

The operation of the invention is explained below with reference to the possible situations of use:

Normal Mode:

In normal mode, the internal combustion engine operates at low dynamics, whereby the increases in fuel demand that occur in this case can be covered by the fuel supply available in the central rail 10. If the rail pressure is higher (by a certain amount) than the internal pressure in the auxiliary fuel pressure accumulator 20, the control valve 13 should preferably be opened and closed in stutter mode until the rail pressure has reached its setpoint and there is a balance between the internal pressures prevailing in the central rail 10 and in the auxiliary fuel pressure accumulator 20. As soon as this condition is met, the control valve 13 remains closed.

Transition to Special Case:

The initial situation is normal operation, in which the internal combustion engine operates under a certain load and with limited dynamics, whereby the increases in fuel demand that occur in this case can be covered by the compressor 4 and the fuel supply available in the central rail 10. Furthermore, the gas pressure in the auxiliary fuel pressure accumulator 20 has a value above the rail pressure. From this initial situation, a transient increase in the target delivery power occurs:

In order to prevent a drop in the actual rail pressure value as far as possible in the event of a transient load increase, or even to enable an increase in the direction of the new rail pressure setpoint value, fuel is to flow from the auxiliary fuel pressure accumulator 20 into the central rail 10 by opening the control valve 13. Preferably, the control valve 13 performs opening and closing movements in immediate succession.

Precise coordination of these opening and closing interval times of the control valve 13 is implemented by an actuator system, with the corresponding coordination preferably being performed by a control unit which can be specified by a corresponding actuator system with knowledge of certain engine parameters and operating variables. Examples of such possible operating variables are the instantaneous rail pressure actual value, the crankshaft actual speed, the setpoint value of the actually feasible fuel injection, the desired value of the fuel injection (i.e. the fuel quantity under whose availability and usability in the combustion chamber the requested output power could be provided) the switching timing of the control valve 13, etc. Optionally, the control unit or another control unit networked with it assumes coordination with the operating state of the air path by detecting certain operating variables of the air path (e.g. the air mass flow) and/or by influencing certain actuators in the air path (e.g. the activation of a throttle valve, if present, or an activation of the electric motor 7 to increase the speed of the compressor 4, whereupon an increase in the charge air mass flow occurs).

Equipped with appropriate software, the control unit can use the degrees of freedom of the internal combustion engine under the given instantaneous conditions—by way of example, the actual and set operating point of the speed-torque trajectory, the actual and set values of the rail pressure, the actual pressure in the auxiliary fuel pressure accumulator 20, the operating state of the air path—to achieve the best possible utilization of the fuel quantity available in the auxiliary fuel pressure accumulator 20.

Insofar as, after the internal combustion engine has been switched on, the auxiliary fuel pressure accumulator 20 contains only very little fuel—i.e. there is a comparatively low level of fuel in it—or the auxiliary fuel pressure accumulator 20 contains only ambient air because the safety concept provides for purging with air, the invention clearly cannot yet be used. In this case, it could be provided that the user is informed that the boost function, i.e. the functional capability of the invention, is only present through temporary high-load operation, which need only be of very short duration.

The system according to the invention is preferably suitable for the use of dynamically operated gas engines and particularly preferably for hydrogen engines. Alternatively or additionally, the system according to the invention is particularly preferably suitable for gas engines used in mobile applications, e.g. road vehicles, mobile working machines, etc.

The use of a system according to the invention is therefore particularly advantageous for hydrogen engines because gaseous hydrogen has a very particularly low volumetric energy density compared with all other fuels. A corresponding increase in the internal volume of the rail or central rail is in turn disadvantageous because, if the mechanical output power demanded by the hydrogen engine decreases and thus the rail pressure is lowered, the quantity of hydrogen to be taken from the rail becomes correspondingly larger, which, however, unlike in the case of diesel fuel, a diesel-like fuel, etc., cannot simply be fed back into the primary fuel tank.

The advantages of the invention can be briefly summarized again as follows:

- The extension according to the invention has a high potential for a rapid increase in the output power at comparatively low
  - additional equipment costs
  - additional weight
  - additional installation space requirements
  - additional energy consumption
- The extension can be easily added to existing fuel supply systems, favoring a common parts strategy (for internal combustion engines with and without this additional equipment.
- A modification of other components and an addition of other components remote from the internal combustion engine is not required. (Only an electrical wiring and/or a hydraulic connection to effect an actuation of that control valve 13 which can block and release the fluid connection between the central rail 10 and the auxiliary fuel pressure accumulator 20).
- The invention can be applied regardless of the form in which the fuel is stored in the primary tank (e.g., in liquid or in gas form, or in a chemically bonded form) and the manner in which it is provided as fuel (e.g., by an evaporation or a reformation).

| List of reference characters | |
|---|---|
| Combustion chamber | 1 |
| Injector | 2 |
| Turbine | 3 |
| Compressor | 4 |
| Exhaust gas path | 6 |
| Electric motor | 7 |
| Charge air path | 8 |
| Central Rail | 10 |
| Rail pressure control valve | 11 |
| Primary fuel path | 12 |

| List of reference characters | |
|---|---|
| Control valve | 13 |
| Electromagnet | 14 |
| Suction tube | 15 |
| Gas connection | 17 |
| Rail opening | 18 |
| Auxiliary fuel pressure accumulator | 20 |
| Air distributor | 30 |
| Internal volume of the air distributor | 30a |
| Leadership | 30b |
| Mounting wall air distributor | 31 |
| Supply tube | 32 |
| Charge air (before entering the air collector) | 33 |
| Charge air (when flowing into the cylinder head) | 33a |
| Fuel | 34 |
| Engine block | 51 |
| Cylinder head | 52 |
| Inlet duct | 52a |
| Liner | 53 |
| Inlet valve | 55 |
| Spark plug | 56 |
| Piston | 57 |
| Cylinder head cover | 58 |

The invention claimed is:

1. Fuel injection device for an internal combustion engine, comprising
a central rail (10) in fluid communication with a primary fuel tank,
an additional fuel pressure accumulator (20), the internal volume of which is directly connected to the central rail (10) only along correspondingly-aligned openings in walls of the central rail (10) and accumulator (20) via a control valve (13) integrated into the central rail (10) or accumulator (20), to temporarily provide a simultaneous fuel supply to the central rail (10) from the additional fuel pressure accumulator (20) and the primary fuel tank,
a pressure sensor integrally-arranged within the central rail (10) and spaced apart from the connection of the central rail (10) with the auxiliary fuel pressure accumulator (20), to protect the pressure sensor from a pressure wave when the connection between the central rail (10) and the auxiliary fuel pressure accumulator (20) is open,
a pressure sensor arranged inside the auxiliary fuel pressure accumulator (20), and
a control system coupled to both said sensors and configured to keep the control valve (13) closed during normal operation of the internal combustion engine and alternately open and close the control valve (13) upon increase in fuel quantity above a threshold value.

2. Fuel injection device according to claim 1, wherein the fuel primary tank is used for storing molecular hydrogen, or a fuel which has a weight proportion of molecular hydrogen of at least 20%, or a liquid hydrogen carrier, and the fuel is injectable into the at least one combustion chamber of the (1) an internal combustion engine after preparation by the fuel injection device.

3. Fuel injection device according to claim 2, wherein the fuel has a weight proportion of molecular hydrogen of at least 40%.

4. Fuel injection device according to claim 3, wherein the fuel has a weight proportion of molecular hydrogen of at least 60%.

5. Fuel injection device according to claim 1, wherein the auxiliary fuel pressure accumulator (20) is a preloaded pressure accumulator.

6. Fuel injection device according to claim 5, wherein the preloaded pressure accumulator is a bladder accumulator.

7. Fuel injection device according to claim 1, wherein the auxiliary fuel pressure accumulator (20) is directly connected to the central rail (10) via the control valve (13).

8. Fuel injection device according to claim 1, wherein the auxiliary fuel pressure accumulator (20) is in fluid connection only with the central rail (10), such that charging and/or discharging of the auxiliary fuel pressure accumulator (20) is possible only via the central rail (10).

9. Fuel injection device according to claim 1, wherein the control valve (13) is a directional control valve.

10. Fuel injection device according to claim 9, wherein the directional control valve is a 2/2 directional control valve.

11. Fuel injection device according to claim 1, wherein the control valve (13) is actuatable via an actuator arranged spatially separate from and/or partitioned off from the control valve (13).

12. Fuel injection device according to claim 11, wherein the actuator is an electromagnet (14).

13. Fuel injection device according to claim 1, wherein the control is further configured to open the control valve (13) under the condition the pressure in the central rail (10) is greater than the pressure in the auxiliary fuel pressure accumulator (20).

14. Fuel injection device of claim 13, wherein the controller is configured to close the control valve (13) when pressure equalization within the auxiliary fuel pressure accumulator (20) and within the central rail (10) has occurred in the presence of a boost operation of the auxiliary fuel pressure accumulator (20).

15. Fuel injection device according to claim 13, wherein the control is configured to open the control valve (13) under the condition the pressure difference exceeds a defined value, and the internal combustion engine is operated in normal mode.

16. Fuel injection device according to claim 1, wherein the controller is configured to take into account one or more engine parameters and/or operating variables of the internal combustion engine for actuating the control valve (13).

17. Fuel injection device according to claim 16, wherein the engine parameters and/or operating variables of the internal combustion engine include actual rail pressure value, crankshaft speed, setpoint value of the fuel injection which can be carried out, and desired value of the fuel injection.

18. Fuel injection device according to claim 1, wherein the controller is configured to monitor the operating state of the air path of the internal combustion engine and control one or more actuators of the air path, taking into account one or more operating variables of the air path and/or the fuel path.

19. Fuel injection device according to claim 18, including a throttle valve as the one or more actuators of the air path.

20. Internal combustion engine comprising a fuel injection device according to claim 1.

* * * * *